July 29, 1969   D. P. KANE ET AL   3,458,206

GOLF BALL CORE

Filed June 3, 1966

INVENTORS
DENNIS P. KANE
WILLIAM A. VAN SANT

BY Hofgren, Wegner, Allen, Stellman & McCord.

ATTORNEYS

United States Patent Office 3,458,206
Patented July 29, 1969

3,458,206
GOLF BALL CORE
Dennis P. Kane and William A. Van Sant, Jr., Covington, Ga., assignors to Brunswick Corporation, a corporation of Delaware
Filed June 3, 1966, Ser. No. 555,060
Int. Cl. A63b 37/08
U.S. Cl. 273—231                    1 Claim

ABSTRACT OF THE DISCLOSURE

A core or center for golf balls, which includes a sphere of rubber like elastic material which has a central cavity for receiving a substantially liquid material. The sphere has an inwardly tapering bore leading to the cavity. The bore is larger than the central cavity in the sphere forming a ridge about the cavity and has an enlarged portion at its outer marginal edge. A tapered plug is insertable into the bore and the plug has an enlarged shoulder which extends into the enlarged portion of the bore. The inner end of the plug is the same size as the bore and abuts against the ridge about the cavity. The plug is slightly larger than the bore to provide a locking taper between the plug and the sphere, and the outer surface of the plug forms a continuation of the outer surface of the sphere.

---

A type of golf ball presently available includes a liquid or paste filled rubber or elastic sphere about which tense rubber thread is wound. The most efficient way to fill the rubber sphere with liquid is to form a central cavity therein with a bore leading to the cavity. The liquid is inserted through the bore and a plug is then inserted into the bore to entrap the liquid within the central cavity. Such liquid filled centers presently available have several disadvantages. First, the plug is merely tapered and has no positive means to prevent over or under insertion into the bore. Of course, precise manufacturing techniques could be devised to maintain precise tolerances but such would lead to very expensive golf balls. Over or under insertion of the plug results in an unbalanced center because of the lack of symmetry of the central cavity and because of the uneven outer surface of the sphere about which the rubber thread is wound. In addition, these plugs do not provide a positive means for preventing leakage of the liquid between the plug and the interior walls of the bore. This invention is designed to solve these problems, as well as provide a much more efficiently manufactured and assembled liquid filled ball center.

Therefore, it is the principal object of this invention to provide a new and improved liquid filled core or center for golf balls and the like.

It is a further object of this invention to provide a liquid filled ball center which permits easy, efficient and inexpensive manufacture of the same.

More particularly, this invention relates to a core or center for golf balls or the like which is comprised of a sphere of rubber or like elastic material having a central spherical cavity for receiving a substantially liquid material or a liquid filled gelatin pill. The sphere is provided with an inwardly tapering frusto-conical bore leading to the cavity. The bore has an enlarged portion about its outer marginal edge. A frusto-conical inwardly tapered plug is insertable into the bore and has an enlarged shoulder extending into the enlarged portion of the bore to prevent over or under insertion of the plug. The bore has a larger diameter than the central cavity in the sphere to form a ridge about the cavity against which the plug abuts to further facilitate a positive fit between the plug and the sphere.

Figure 1:
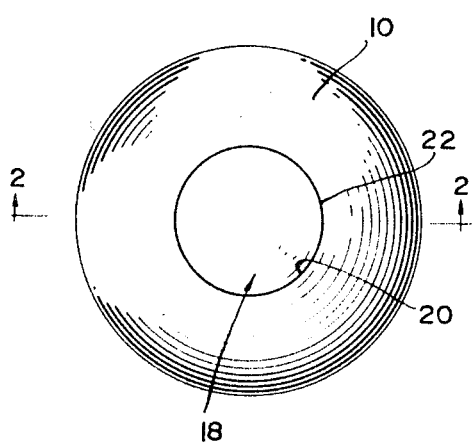
Figure 3:
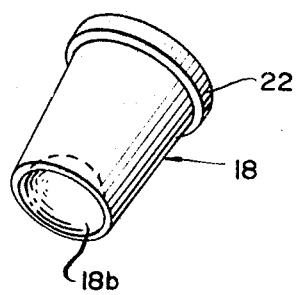
Figure 2:
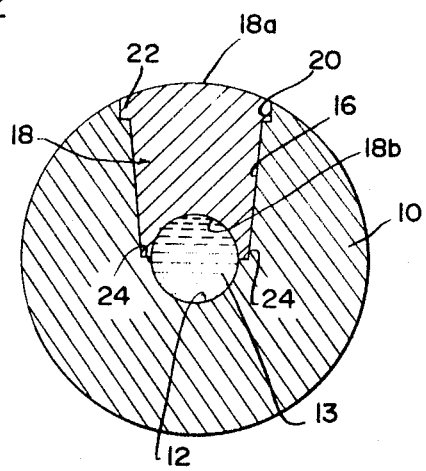

Other objects and advantages of the invention will become apparent from the following detailed description taken in connection with the accompanying drawings in which:

FIG. 1 is a top plan view of a ball center embodying the invention;
FIG. 2 is a central sectional view taken generally along the line 2—2 of FIG. 1;
FIG. 3 is a perspective view of the tapered plug; and
FIG. 4 is a view of a liquid filled gelatin pill which comprises one embodiment of the liquid filling for the ball center of this invention.

Figure 4:

Referring generally to the drawings, a liquid filled ball center embodying the invention is shown to comprise a sphere 10 of rubber or like elastic material having a central semi-spherical cavity 12 for receiving a substantially liquid material 13 or a liquid filled gelatin pill 14 (FIG. 4). The sphere has an inwardly tapering frusto-conical bore 16 leading to the central cavity 12. A frusto-conical inwardly tapered plug 18 is insertable into the bore 16. The plug is slightly larger than the bore to provide a locking taper between the plug and sphere. The plug has an outer spherical surface 18a which forms a continuation of the outer surface of the sphere 10 and an inner semi-spherical recess 18b which forms a continuation of the central cavity 12 for receiving the liquid material 13 or the liquid filled gelatin pill 14.

In order to provide a positive interference fit between the plug 18 and the sphere 10, the tapered bore has an enlarged portion 20 about its outer perimeter. The plug 18 is provided with an annular flange or shoulder 22 which extends into the enlarged portion 20 of the bore. The inner end of the bore has a larger diameter than the semi-spherical cavity 12 forming a ridge 24 about the cavity. The inner end of the plug abuts against ridge 24 and is slightly larger than the inner end of the bore. The shoulder 22 of the plug (abutting the enlarged portion 20 of the bore), and the ridge 24 at the base of the bore (against which the base of the plug abuts) perform three valuable functions. First, shoulder 22 and ridge 24 provide a positive fit which prevents over or under insertion of the plug 18 which would result in an unbalanced center. Secondly, as tense rubber thread is wound about the sphere 10 and the outer surface 18a of the plug, a tight fit at shoulder 22 and ridge 24 prevents leakage of the liquid from the central cavity outwardly between the plug and the walls of the bore 16. Thirdly, as will be more clearly shown below, an easier assembly is provided which results in efficient manufacturing and thus a less expensive ball center.

One method of assembling the ball center of this invention is to immerse the sphere 10 in a liquid to fill the central cavity 12 and the tapered bore 16. The tapered plug 18 is then inserted into the bore while holding the whole assembly below the liquid surface. In this manner the liquid is entrapped in the center without any chance of air entrapment. It can readily be seen that the positive interference fit between the plug 18 and the sphere 10 removes any worry by the assembler of over or under insertion of the plug, thus resulting in a speedier and more efficient assembly and therefore a less expensive ball. The center (comprised of sphere 10 and plug 18) is then wound with tense rubber thread in the conventional manner. The center may be frozen to facilitate winding if necessary. The combination of the thread winding over the end of the plug and the interference fit of the plug in the sphere prevent any leakage of the liquid from the central cavity.

An alternate method of assembly is to place the liquid filled gelatin pill 14 in the ball cavity and then insert plug 18 into the bore 16 in sphere 10, again, without any concern by the assembler of over or under insertion. The center can then be wound with tense rubber thread.

Thus it can be seen that we have provided a new and improved liquid core or center for golf balls or the like, a center which is evenly balanced, easily assembled, and one which prevents leakage of liquid from its central cavity.

While this invention is susceptible of embodiment in many different forms, there is shown in the drawings and is herein described in detail one embodiment of the invention, with the understanding that the present disclosure is to be considered as an exemplification of the principles of the invention and is not intended to limit the invention to the embodiment illustrated. The scope of the invention will be pointed out in the appended claim.

We claim:

1. A balanced core for a golf ball, said core comprising a spherical liquid center, and a solid, spherical elastic shell surrounding and encasing said liquid center within a central spherical cavity thereof, said shell consisting essentially of:
    (a) a first shell member containing a central recess forming a first portion of the central spherical cavity and
        (1) means defining a spherical outer surface,
        (2) wall means defining an inwardly tapered bore leading to said central recess, the inner end of said bore being larger than the diameter of said central recess to define an abutment ridge in said first shell member laterally of said central recess, and
        (3) means forming a peripheral recess about said bore at the juncture of said wall means and said spherical outer surface, said peripheral recess being defined by a first surface extending transversely of said wall means and facing said spherical outer surface to define a shoulder, and a second surface extending outwardly from said first surface and offset from said wall means; and
    (b) a second shell member defining a plug filling said bore, said second shell member including:
        (1) an outer spherical surface continuous with the outer spherical surface of said first shell member,
        (2) an annular flange extending laterally outwardly into the peripheral recess of said first shell member, said flange being defined by a first surface abutting the first surface of said peripheral recess, and a second surface coextensive with the second surface of said peripheral recess,
        (3) a tapered side wall surface coextensive with said wall means of said first shell member,
        (4) a bottom surface abutting the ridge at the inner end of said bore, and
        (5) a recess in said bottom surface defining a second portion of said spherical cavity.

References Cited

UNITED STATES PATENTS 2,278,551 4/1942 Martin _____ 273—231
2,989,068 6/1961 Delacoste.

FOREIGN PATENTS 28,750 1902 Great Britain.

GEORGE J. MARLO, Primary Examiner